United States Patent
Chouzenoux et al.

(10) Patent No.: US 7,151,377 B2
(45) Date of Patent: Dec. 19, 2006

(54) PERMANENT APPARATUS FOR MONITORING A WELL BY INJECTING CURRENT THROUGH THE CASING INTO THE FORMATIONS

(75) Inventors: Christian Chouzenoux, St. Cloud (FR); Yves Manin, Le Plessis Robinson (FR); Didier Pohl, Paris (FR); Philippe Souhaite, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 21 days.

(21) Appl. No.: 10/490,820

(22) PCT Filed: Sep. 17, 2002

(86) PCT No.: PCT/EP02/10431

§ 371 (c)(1),
(2), (4) Date: Aug. 16, 2004

(87) PCT Pub. No.: WO03/029615

PCT Pub. Date: Apr. 10, 2003

(65) Prior Publication Data

US 2004/0263175 A1    Dec. 30, 2004

(30) Foreign Application Priority Data

Oct. 1, 2001    (FR) ................... 01 12590

(51) Int. Cl.
*G01V 3/02* (2006.01)
*G01V 3/20* (2006.01)
(52) U.S. Cl. ............... 324/368; 324/373; 324/375
(58) Field of Classification Search ........ 324/368, 324/347, 354–356, 357–370, 373–375
See application file for complete search history.

(56) References Cited

U.S. PATENT DOCUMENTS

| | | | | |
|---|---|---|---|---|
| 5,642,051 A | * | 6/1997 | Babour et al. | 324/357 |
| 5,767,680 A | * | 6/1998 | Torres-Verdin et al. | 324/355 |
| 6,480,000 B1 | * | 11/2002 | Kong et al. | 324/338 |
| 6,633,164 B1 | * | 10/2003 | Vinegar et al. | 324/355 |
| 6,727,827 B1 | * | 4/2004 | Edwards et al. | 340/854.9 |
| 6,894,499 B1 | * | 5/2005 | Dumont et al. | 324/368 |
| 7,071,696 B1 | * | 7/2006 | Gambier et al. | 324/347 |
| 2001/0052774 A1 | * | 12/2001 | Rossi et al. | 324/357 |

FOREIGN PATENT DOCUMENTS

EP    0294809 A    12/1988

(Continued)

*Primary Examiner*—Jay M. Patidar
(74) *Attorney, Agent, or Firm*—Victor H. Segura; Brigitte L. Echols (57) ABSTRACT

Apparatus for monitoring an underground formation through which a borehole passes, comprises a conductive casing (6) located in the borehole (1) passing through the formation (4); a plurality of sensors (12-1) for measuring an electrical property of the formation (4) located in the borehole (1) outside the casing (6) and electrically insulated therefrom; and an electrical current source (11) positioned in the borehole (1) passing through the formation (4) and arranged to inject a current into the formation (4); the casing (6) having an electrically insulating coating (14) over the surface thereof, at least in the region of the sensors (12-1), and an electrically conductive portion (11) in electrical contact with the formation (4); and a current supply (10) being connected to the casing (6) such that current flows into the formation (4) from the electrically conductive portion (11) which acts as the current source, the sensors (12-1) measuring the electrical property of the formation (4) resulting from such current flow.

22 Claims, 9 Drawing Sheets

FOREIGN PATENT DOCUMENTS

| | | |
|---|---|---|
| EP | 0863412 A | 9/1998 |
| EP | 0964134 A | 12/1999 |
| FR | 2712627 A | 5/1995 |
| FR | 2729227 A | 7/1996 |
| FR | 2740170 A | 4/1997 |
| WO | WO 01 65066 A | 9/2001 |

* cited by examiner

PERMANENT APPARATUS FOR MONITORING A WELL BY INJECTING CURRENT THROUGH THE CASING INTO THE FORMATIONS

This invention relates to an apparatus for monitoring underground formations, particularly an oil or gas reservoir, through which a well passes.

The technique of injecting a fluid (water, steam, etc.) under pressure through an injection well into an oil deposit to force hydrocarbons (oil or gas) towards a production well is a technique that is widely used for "secondary" extraction purposes. The injection fluid maintains or restores the pressure in the deposit and drives the oil or gas in front of it as it passes from the injection well(s) to the producing well(s). This fluid injection technique, frequently using water (possibly brine) or a gas is now often used from the first time a deposit is exploited. It is important to monitor how the interface between fluids changes over time in order to stop or reduce production before the injection fluid reaches the production well.

Similarly, it is important to be able to monitor changes in natural water or gas areas that frequently occur in oil formations and that can move closer to the production well as oil or gas production continues.

The advance movement of the injected fluid or the fluid naturally present in the oil formation is not always regular and fingering can occur. It is therefore important to carry out monitoring at different depths in the well in order to detect such occurrences.

U.S. Pat. No. 5,642,051 discloses an apparatus for monitoring an underground formation through which a borehole passes, comprising a conductive casing located in the borehole passing through the formation; a plurality of sensors for measuring an electrical property of the formation located in the borehole outside the casing and electrically insulated therefrom; and an electrical current source positioned in the borehole passing through the formation and arranged to inject a current into the formation. In this document, a network of measurement electrodes is set up permanently in the well between the outside wall of the casing and the inside wall of the well. These measurement electrodes are installed in parallel and are used in turn to circulate a current in the reservoir formation while the others are used to measure the potential value thus induced. This measurement repeated in time is then interpreted in terms of variation of the resistivity of the formation in the measurement zone, and therefore saturation of the formation with water. The electrodes are fixed on the outside wall of the casing and the casing is coated on the outside with an electrically insulating material, or is fabricated from such a material, in the region of the electrodes. The space in which the electrodes are positioned is filled with cement in the conventional manner. This device has several disadvantages.

The casing is formed of several elements assembled end to end by threaded couplings. The electrically insulating coating can be easily damaged during assembly, particularly at the threaded ends, by the claw grips used to tighten the various elements when screwing two elements together or when lowering the casing into the well.

This apparatus requires a cable with a relatively large cross section running along the outside wall of the casing from the surface as far as the electrodes since they are used both to circulate electrical currents (of the order of a few amperes) in the reservoir formation and to measure potentials (of the order of a hundred millivolts). The space available between the wall of the well and the casing is often very small, for example less than two centimeters, and it is therefore difficult to house such a multiconductor cable having a cross section of up to several square centimeters in this space. Also, at the well head and at any packers in the well, it is also required to minimize the number of cables for space reasons and also because of the difficulties encountered in forming properly sealed cable feedthroughs.

With such a system, a measurement acquisition cycle may take several hours because different electrodes are scanned, each of them acting as the power supply electrode in turn, while the others output the measurement potential, also in turn. The measurement acquisition frequency is limited and continuous monitoring is only possible if there is a large number of electrodes.

The present invention aims to overcome the disadvantages mentioned above by providing an apparatus for monitoring underground formations that is simple to install in the well, and is reliable and inexpensive, and that can be used for almost continuous monitoring.

The present invention is characterised in that the casing has an electrically insulating coating over the outer surface thereof, at least in the region of the sensors, and an electrically conductive portion in electrical contact with the formation; and a current supply is connected to the casing such that current flows into the reservoir from the electrically conductive portion which acts as the current source, the sensors measuring the electrical property of the formation resulting from such current flow.

The current source can comprise a power supply connected to a reference electrode offset from the well, typically at the ground surface, and to the casing. The power supply may be connected to the casing at the surface, particularly if the reservoir is not too deep. Alternatively, the power supply may be connected to the casing at depth, the casing including an electrically insulating connector between the connection with the source and the surface.

If the bottom of the casing is deeper than the reservoir, it may include an electrically insulating connector between the bottom end of the casing and the bottom of the reservoir to limit the extent of the casing concerned by current circulation.

When the casing is formed from elements screwed in an end to end arrangement by means of threaded couplings, the conductive portion can be provided at the threaded coupling.

The sensors, typically measurement electrodes, may be fixed to the casing and connected to the surface via a link wire that runs along the walls of the casing. In another embodiment, the measurement electrodes are connected to the surface via an inductive coupling which can pass through the wall of the casing.

Acquisition and processing means may be provided to receive the measurement signals output by the sensors. The acquisition and processing means may be located entirely at the surface, but preferably they will be entirely or partly below the surface in the well. In such a case, the downhole portion can be located in a housing fixed to the casing.

The acquisition and processing means typically comprise a measurement shaping device referenced with respect to a reference voltage. The reference voltage may be the reference electrode voltage or preferably the voltage of the casing close to the measurement electrode.

The acquisition and processing means may also comprise a multiplexer to select a particular sensor from which to obtain a measurement signal, and optionally an analogue digital conversion device to digitize the measurement signal. A memory device may also be provided to store the signals.

The acquisition and processing means can cooperate with an operation and control device to control the production from the well.

Figure 1A:
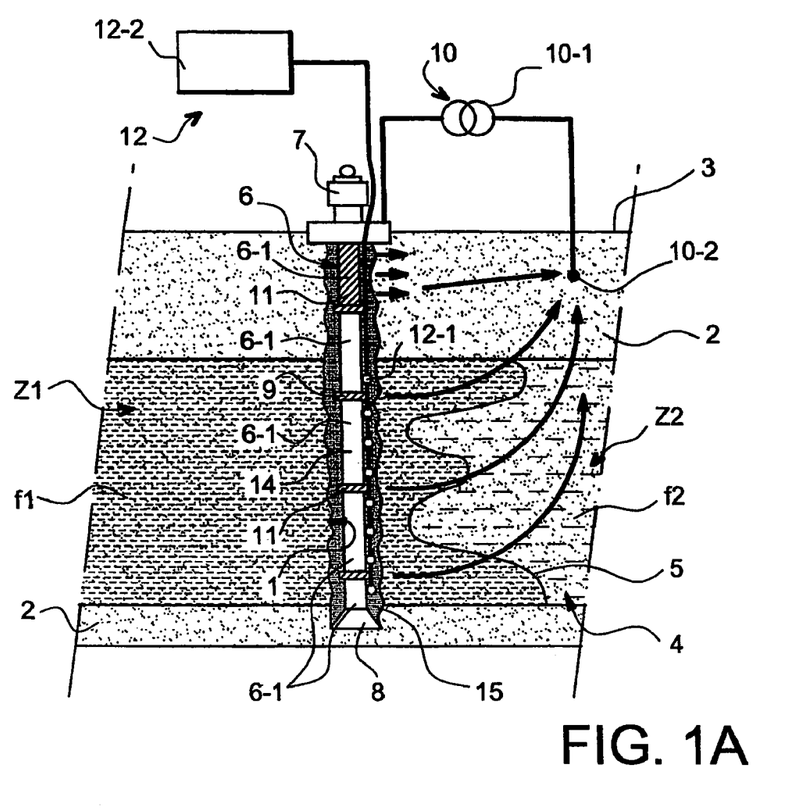
FIGS. 1A, 1B respectively show a device according to the invention installed in a well, and a detail of the device.
Figure 1B:
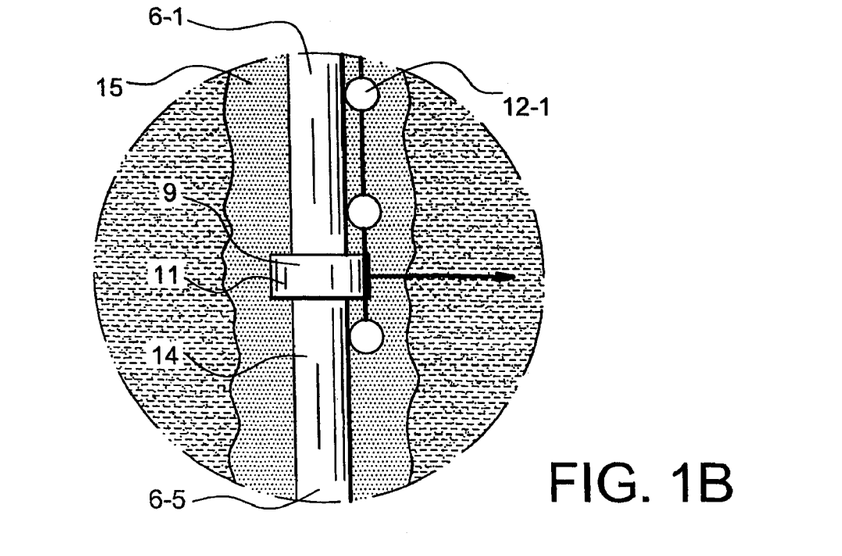

Referring to FIGS. 1A and 1B there is shown a general view and a partial detailed view of an apparatus according to an embodiment of the invention installed in a well 1 extending through underground formations 2, and opening at the surface 3. A fluid reservoir 4 is located in the formations 2. The reservoir 4 contains a first fluid f1 (oil or gas) that is to be extracted from a zone Z1, for example, and brought to the surface through the production well 1. The well 1 passes through the reservoir 4 in zone Z1.

Reservoir 4 also contains a second fluid f2 in zone Z2 that forms an interface 5 with the first fluid f1. This second fluid f2 may be water (brine) or gas. This second fluid f2 may be injected into the reservoir 4 in order to force the first fluid f1 towards the production well 1 by increasing or maintaining the pressure in the reservoir 4.

The production well 1 comprises a casing 6 inside the borehole and a production tubing (not shown) inside and concentric with the casing 6, through which the fluid f1 to be extracted from the reservoir 4 will be transported to the surface 3. The end of the casing 6 at the surface 3 is terminated by a wellhead 7. The bottom end of the casing 6 is fitted with a casing shoe 8 that protects it and facilitates its lowering into the well 1. The casing 6 is formed from several casing elements 6-1 that comprise electrically conducting metallic tubes placed end to end and assembled to each other by threaded couplings 9. The casing elements 6-1 are provided with a coating 14 on the outer surface formed from an electrically insulating material.

Means for monitoring the fluid reservoir 4 comprise means of circulating an electrical current in the reservoir 4 with a power supply source 10-1 connected at one end to a reference electrode 10-2 offset from the well 1, preferably inserted in the ground 2 at the surface 3, and at the other end is connected to the casing 6. The current from the power supply source 10-1 can therefore propagate into the formation between the casing 6 and the reference electrode 10-2.

In order to circulate current, the outside wall of the casing 6 comprises one or more bare zones 11 not coated with the electrically insulating material and which therefore conduct electricity. These zones 11 as current supply electrodes. It is preferable that these zones 11 should surround the couplings 9 located at the ends of each casing element 6-1 since the couplings are often stressed and subjected to relatively harsh physical handling when the various elements of the casing are screwed together which might otherwise damage the insulating coating and leave conducting potions. The current injected into the underground formations may be DC current or preferably low frequency AC current that limits corrosion of the casing and reduces noise.

The apparatus also comprises sensors 12 for measuring an electrical magnitude representative of a characteristic of the reservoir 4. These comprise typically one or more measurement electrodes 12-1 placed in the well 1 and electrically insulated from the casing 6, and means for acquisition and processing of measurements 12-2 connected to the measurement electrodes 12-1. FIGS. 1A and 1B show a network of measurement electrodes 12-1 distributed along the casing 6 at the reservoir 4 to make series of measurements at different depths in the reservoir 4.

The measurement electrodes 12-1 are electrically insulated from the casing 6 by means of the electrically insulating coating 14 located on the outside wall of the casing 6. This coating may, for example, be made from a plastic material resistant to heat, an epoxy resin, ceramic, glass fiber, these materials being used alone or in combination. The measurement electrodes 12-1 may be fixed onto the casing 6 thus coated, or they may be in the form of a metallic ring surrounding the casing 6 and are typically uniformly distributed on the casing elements 6-1. The space remaining between the casing 6 and the inner wall of the well 1 is filled with cement 15 that has a known electrical resistivity, ideally of the same order of magnitude as the resistivity of the underground formations encountered in order to not unduly affect the measurements.

The apparatus has the advantage that it is not important if the electrically insulating coating 14 is slightly damaged while the casing is being put into place, provided that the measurement electrodes 12-1 do not come into contact with the electrically conducting material of the casing 6.

It is possible that the casing might be in a measurement well as opposed to a production well, in which case the cement 15 and the casing 6 enable the measurement electrodes 12-1 to be isolated from the fluid extracted from well 1.

Figure 6:
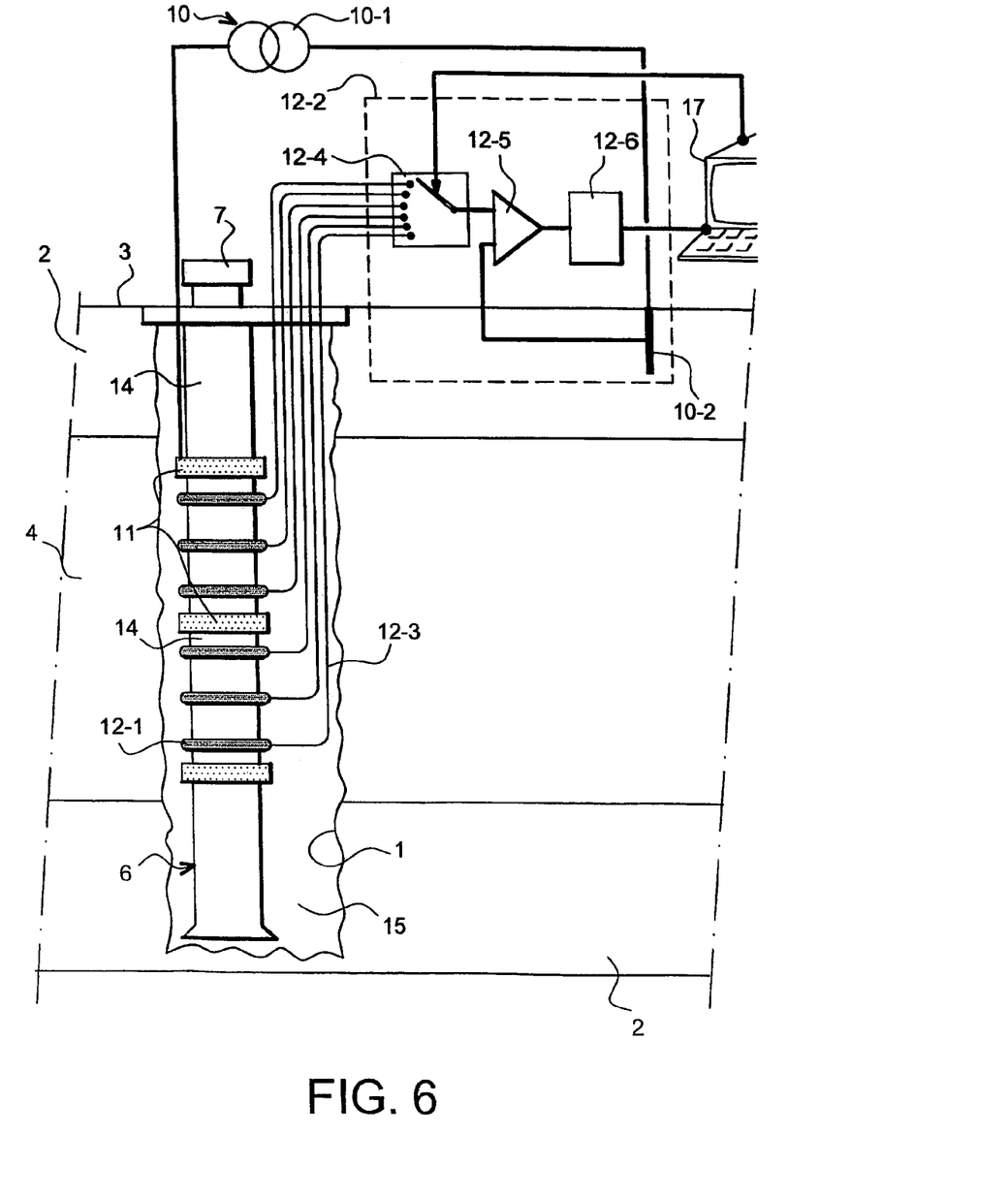
FIGS. 6 to 10 illustrate different embodiments of the device according to the invention.
Figure 9:
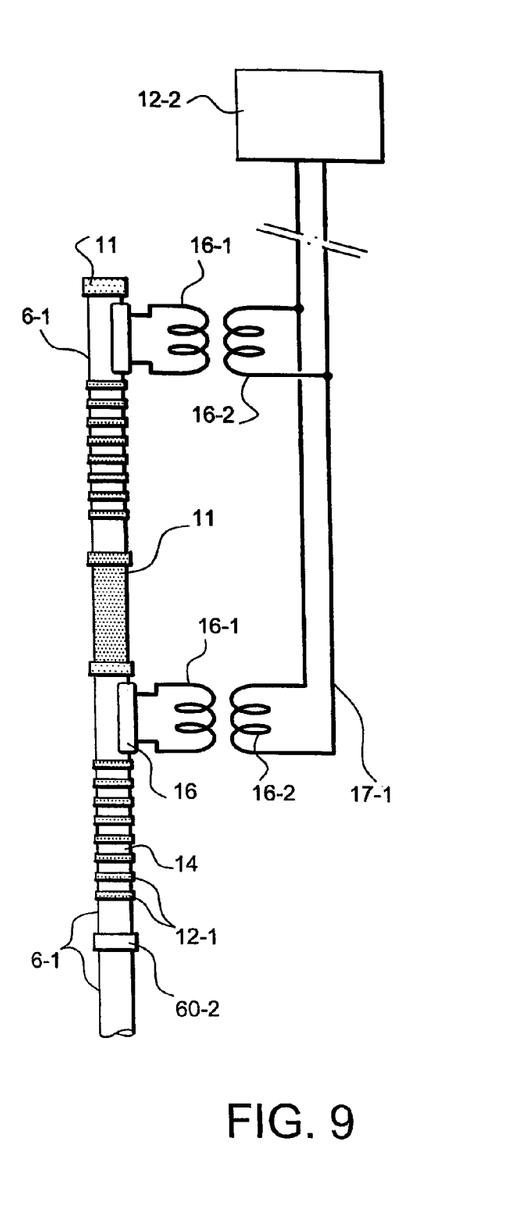

The electrical conductivity of the casing material 6, usually steel, is much higher than the conductivity of the underground formations 2 and it may be considered that when the casing 6 is energized, it is at equipotential in the area of interest in which the measurement electrodes 12-1 are fitted. However, if the reservoir 4 is very deep and/or if the underground formation 2 between the surface 3 and the reservoir 4 has very low resistivity, it is preferable if the link between the casing 6 and the current supply 10-1 is made at depth in the well order to limit losses. The casing 6 may then comprise a connector made of an electrically insulating material 60-1 between the surface 3 and the downhole connection with the current supply 10-1. This is illustrated in FIG. 6. Similarly, if the casing 6 continues to a depth greater than the depth beyond the reservoir 4, it is preferable if a connector made of an electrically insulating material is provided between the bottom of the reservoir 4 and the bottom end of the casing. The casing 6 shown in FIG. 9 is fitted with such a connector 60-2.

The measurement electrodes are used to acquire an electrical magnitude representative of a characteristic of the reservoir, and variations in the magnitude measured the same electrode for measurement separated in time are determined. This of variation indicates that the characteristic properties of the formation close to the electrode have changed, indicating that the environment close to the electrode concerned has changed and that the distribution of fluids has been modified.

The electrical magnitude forming the measurement may be a potential or a current. The characteristic property of the reservoir affecting the measurement is its resistivity and conversely, its saturation with fluid close to the electrodes concerned.

Figure 2A:
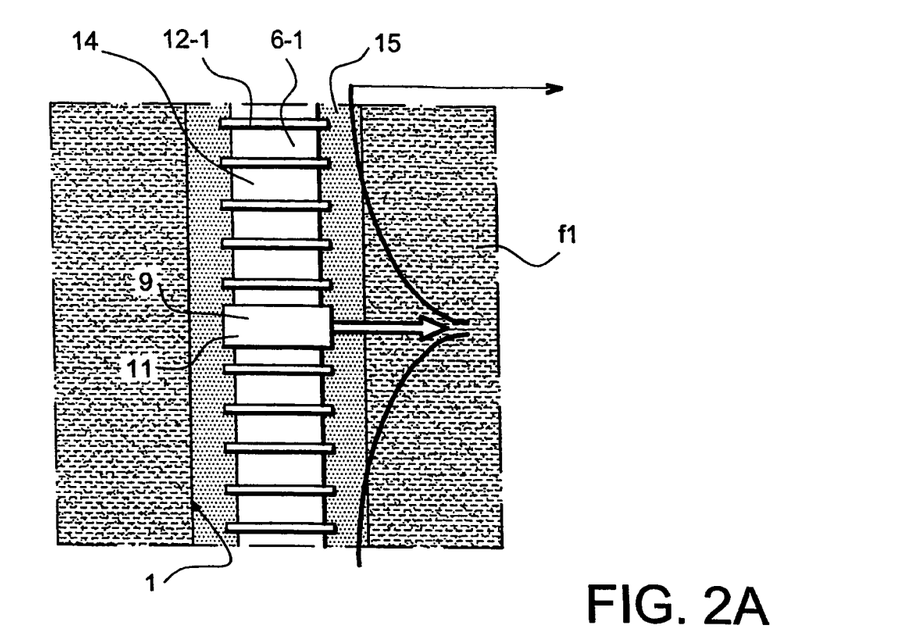
FIGS. 2A, 2B diagrammatically show the potential distribution on each side of an electrically conducting coupling of the casing, in an initial situation in which a fluid is located close to the well, and in a later situation in which a second fluid has infiltrated close to the well.
Figure 2B:
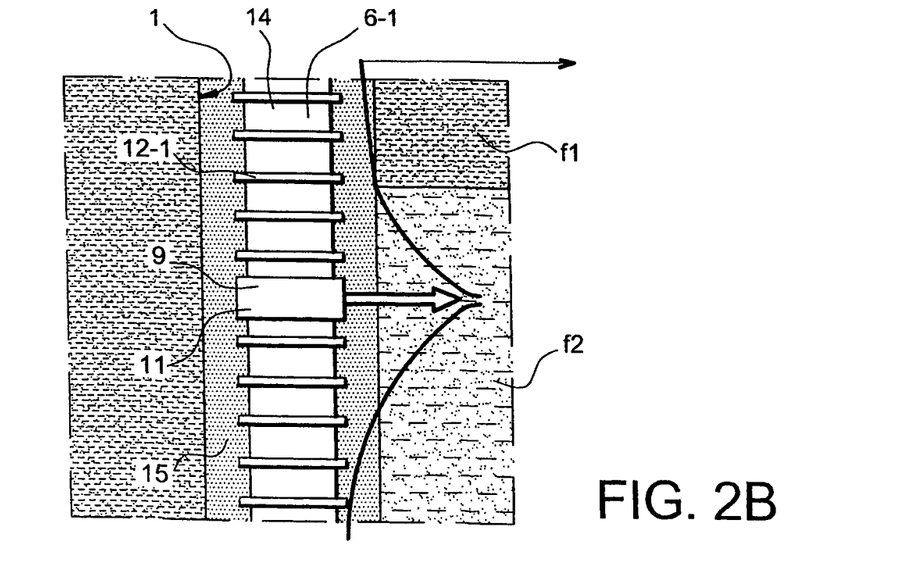

FIGS. 2A and 2B show part of an apparatus according to an embodiment of the invention at a portion of the casing 6. FIG. 2A diagrammatically shows the initial situation. The well 1 passes through the reservoir containing one of the fluids f1. It is assumed that this fluid is oil. When the current is output through the conducting coupling 9 of the casing 6, most of this current circulates in the cement 15 which is a better conductor than the formation containing oil. The current is shown diagrammatically by the arrow.

In this example, the potential distribution output by the measurement electrodes 12-1 located on each side of the coupling 9 is shown. The potential is shown diagrammatically by curves on each side of the current arrow and its profile is fairly flat. FIG. 2B diagrammatically shows a later situation in which another fluid f2, assumed to be brine, has invaded part of the reservoir 4 close to the well. This fluid f2 is much better conductor of electricity than the first fluid f1. A greater quantity of current will circulate in the part of the formation containing this second fluid f2 and since the potential at the coupling 9 is approximately constant, the potential distribution output by the measurement electrodes 12-1 located in the invaded zone will change. It will be understood that current measurements could be made instead of the potential measurements described.

Figure 3A:
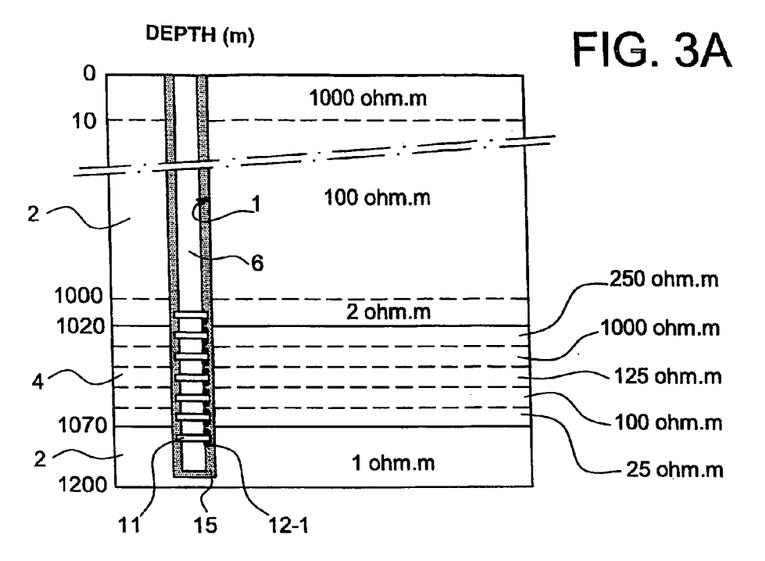
FIGS. 3A and 3B show the configuration of the reservoir through which the well passes in the two situations.
Figure 3B:
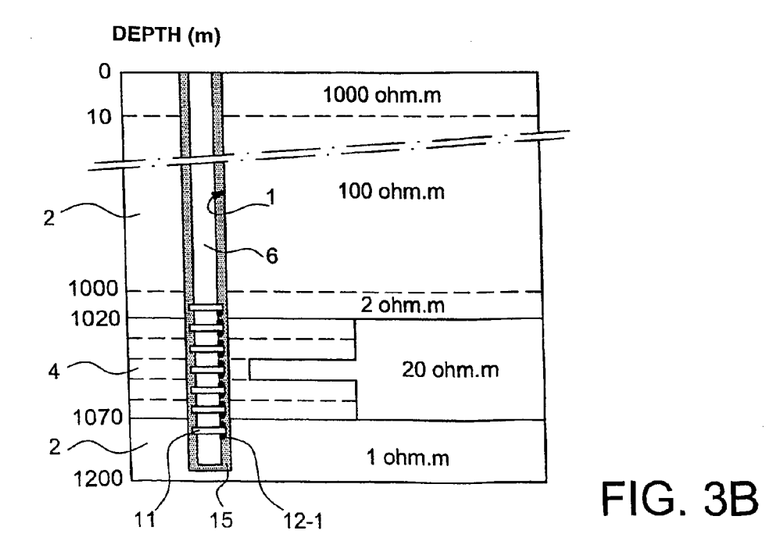

FIGS. 3A and 3B illustrate an example of a reservoir 4 through which a well 1 passes, for which the variation will be studied using the device according to an embodiment of the invention. FIG. 3A illustrates an initial situation and FIG. 3B illustrate a later situation similar to the previous case. This reservoir 4 with a thickness of 15 meters is located at a depth of about 1020 meters. The resistivities of the different formation layers on each side of the reservoir are indicated. They vary between 1 Ω.m and 1000 Ω.m The reservoir 4 is formed from several stacked layers, and the resistivities of these layers in the initial situation before the injection of water to facilitate discharge of the fluid to be extracted, are shown on FIG. 3A. In the later situation, water has been injected into reservoir 4, it has become close to well 1 and has formed a fingering as shown on FIG. 3B. Measurements made by the device according to the invention will be able to determine the depth of the fingering. It is assumed that the resistivity of the zone full of water is approximately constant and equal to 20 Ω.m.

Figure 4A:
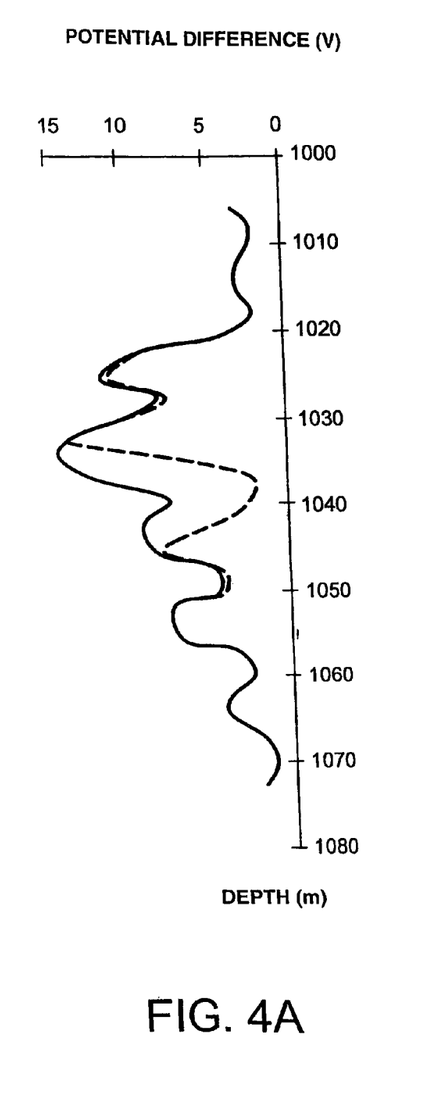
FIGS. 4A and 4B are graphs illustrating the measurements made in the well as a function of the depth.
Figure 4B:
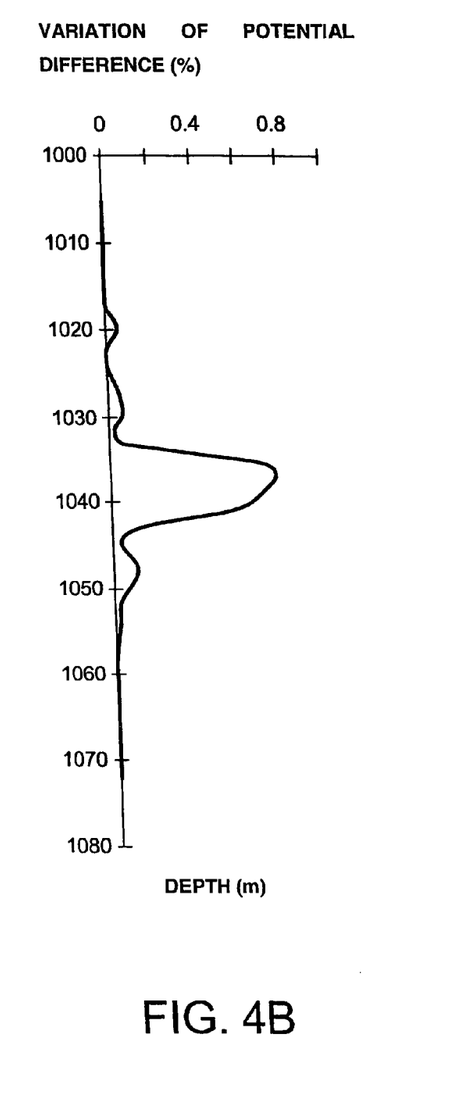

FIGS. 4A and 4B illustrate the results of the measurements made. The casing 6 is shown with its electrically conducting couplings 9 and between them the coating of electrically insulating material 14. In the initial situation and in the later situation, the potential Vmes of each measurement electrode 12-1 (not shown) is measured with respect to a potential reference Vref. It may consist of the potential of the reference electrode 10-2 on the surface. In a variant that will be described in detail below, the reference may be the potential of the casing 6 close to the measurement electrode concerned. The curve shown in solid lines shows the potential difference at each of the measurement electrodes as a function of the depth, in the initial situation. The curve in dashed lines shows the same parameters but in the later situation during fingering. Note that the two curves are very different between depths 1035 and 1045 meters, whereas they are practically coincident with each other on each side of this range of elevations. There is a potential drop on the curve in dashed lines and this potential drop represents the variation of the resistivity corresponding to fingering. The position of the fingering in depth can then be determined. The curve in FIG. 4B is the difference between the two curves in FIG. 4A.

Figure 5:
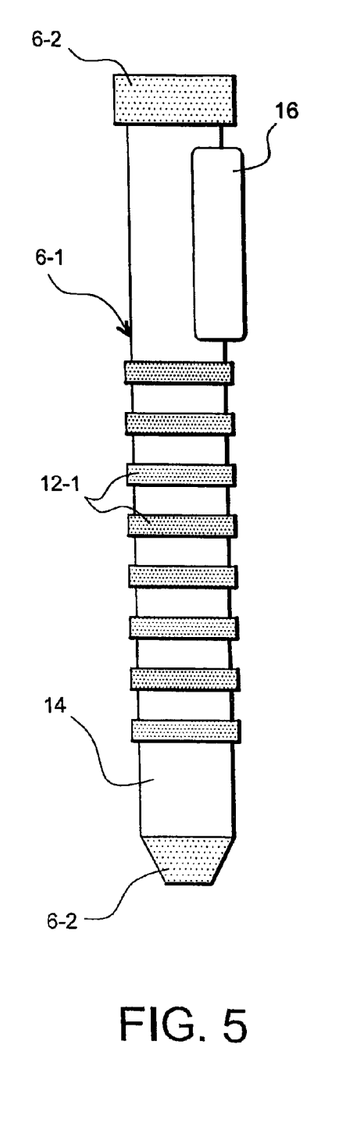
FIG. 5 illustrates an element of the casing supporting part of the device according to the invention.

FIG. 5 diagrammatically illustrates an example of a casing element 6-1 that can be used in the present invention. The casing element 6-1 is coated on the outside with an insulating material except at its two ends 6-2 that remain bare so as to conduct electricity and contribute to circulation of current in the reservoir. A series of measurement electrodes 12-1 arranged in a ring is located on the coating. The upper end corresponds to the electrically conducting coupling 11. The lower end will be screwed into the coupling of another casing element. It also conducts electricity. There is a housing 16 between the series of measurement electrodes 12-1 and one of the ends. This housing, fixed on the outside to the casing element 6-1, contains some or all of the measurement acquisition and processing means 12-2 that are connected to measurement electrodes 12-1. In particular, the fact that measurements collected by electrodes 12-1 are acquired and processed at depth limits the number of conductors to be brought up to the surface to route them to a control and operating device.

FIG. 6 shows a series of measurement electrodes 12-1 arranged longitudinally on the casing 6 on the outside wall. Each of these electrodes 12-1 is connected through a link cable 12-3 to the input of the measurement acquisition and processing means 12-2 located on the surface 3. These measurement acquisition and processing means 12-2 comprise a multiplexer 12-4 that is connected at the input to the measurement electrodes 12-1 through cables 12-3 and at the output to the input of a shaping device 12-5 into which the reference potential is also input. For example, this shaping device 12-5 may comprise an amplifier. The reference potential in this example is the potential of the reference electrode 10-2 that is on the surface. The measurements may then be converted into digital signals, after shaping. Reference 12-6 represents an analogue digital conversion device designed for this purpose. After conversion, the digitized measurements supply an operating and control device 17 diagrammatically shown as a microcomputer. The control device 17 controls the multiplexer 12-4. In this configuration, there is one cable 12-3 for each measurement electrode 12-1 between the outside wall of the casing 6 in well 1 and the inside wall of well 1, but, unlike the previous proposals, thesecables can be single conductor cables with a very small cross section since the voltages to be measured are of the order of a few millivolts. In this example, the connection between the power supply source 10-1 and the casing 6 is also made at depth.

Figure 7:
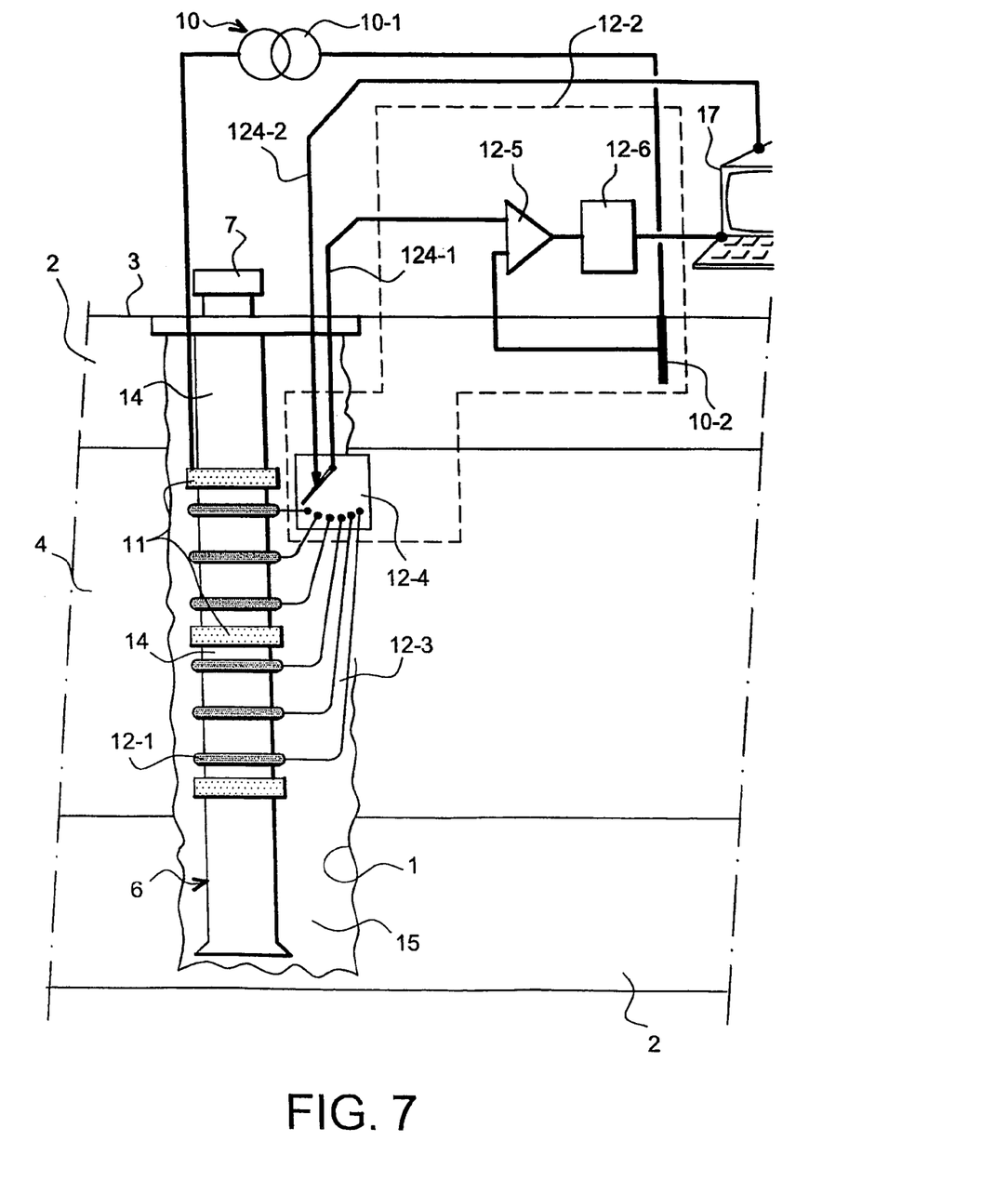

FIG. 7 shows an example of the apparatus in which part of the processing is performed at depth. This allows the number of conductors in the well I to be reduced. The difference from FIG. 6 is that the multiplexer 12-4 is now at depth in the well. The multiplexer 12-4 may be encapsulated in the housing 16 shown in FIG. 5. The multiplexer 12-4 is connected firstly through a measurement cable 124-1 to the shaping device 12-5 located at the surface outside the well and through a control cable 124-2 to the operating and control device 17. The measurement cable 124-1 may be a single conductor cable, and may possibly be shielded, whereas the control cable 124-2 may be a two conductor cable, possibly shielded. The shaping device 12-5, the conversion device 12-6 and the operating and control device 17 are at the surface and may be similar to those shown in FIG. 6.

Figure 8:
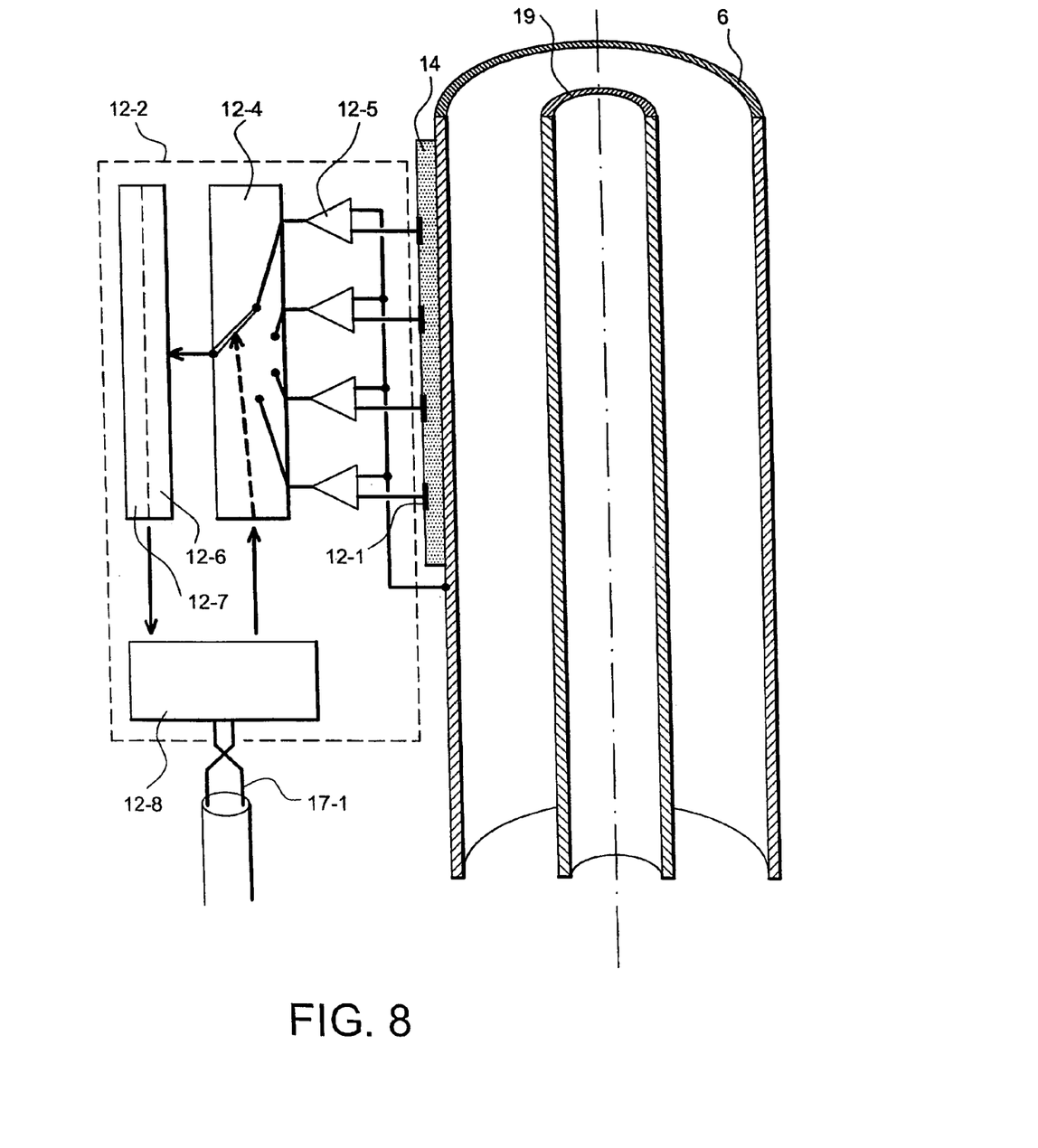

FIG. 8 shows another configuration in which the measurement acquisition and processing means 12-2 are at depth in the well. In this case, the risk of noise occurring is limited by carrying out the processing at depth and particularly performing the analogue digital conversion close to the measurement electrodes. In this example, there are several shaping devices 12-5, each of them being connected at the input to a measurement electrode 12-1. In the case in which the acquisition and processing means are located at the bottom of the well, it is preferable to condition the signal as close as possible to the electrodes, to improve the signal to noise ratio. Therefore, a preamplification stage may be placed on the input side of the multiplexing.

Shaping is done with respect to the reference potential that is now the potential of the casing 6. The input of the shaping devices 12-5 may also be connected to the casing 6, at a location on which there is no coating of an electrically insulating material 14. The output from the shaping devices 12-5 is connected to the input of a multiplexer 124, the output of which is connected to an analogue digital conversion device 12-7. The output from the analogue digital conversion device 12-6 may be connected to a memory device 12-7. A single cable 17-1, for example a twisted pair, can be used in this case. This cable carries the electrical power supply, control signals for the multiplexer, and is also used for transmission of stored signals. A frequency modulation technique may be used to transport the signals and electrical power on the same cable.

A demodulation device is inserted between the output from memory device 12-7, the control input to the multiplexer 12-4 and the cable 17-1. The cable 17-1 leads to a number of locations including the operating and control device located on the surface (not shown). The memory device 12-7 can be omitted, and the analogue digital conversion device 12-6 can be connected directly to the demodulation device 12-8. No memory device is shown in FIGS. 6 and 7, since the signals can be stored in a memory of the operating and control device 17.

FIG. 9 shows a further example of casing suitable for use in the invention comprising several casing elements 6-1 fixed end to end with electrically insulating coating 14 at the measurement electrodes 12-1 and bare zones 11 without any insulating coating to circulate current in the reservoir 4. The lowest casing element 6-1 is fitted with a connector 60-2 made of an electrically insulating material to limit current circulation downwards, since this element will be lower than the reservoir.

The two elements of the casing 6-1 that will be located within the reservoir each comprise a housing 16 in which the acquisition and processing means 12-1 will be fitted. Instead of these means being connected through a cable to the operating and control device (not shown) at the surface, the link can be made by inductive coupling. Each of the housings 16 is equipped with an induction loop 16-1 that will cooperate with another induction loop 16-2 connected through a cable 17-1 to the operating and control device 17. The electrodes are then connected to the surface through the inductive coupling. This structure is possible because the acquisition and processing means 12-1 are independent, and are only referenced to each other through the casing 6 and they consume very little energy.

Figure 10:
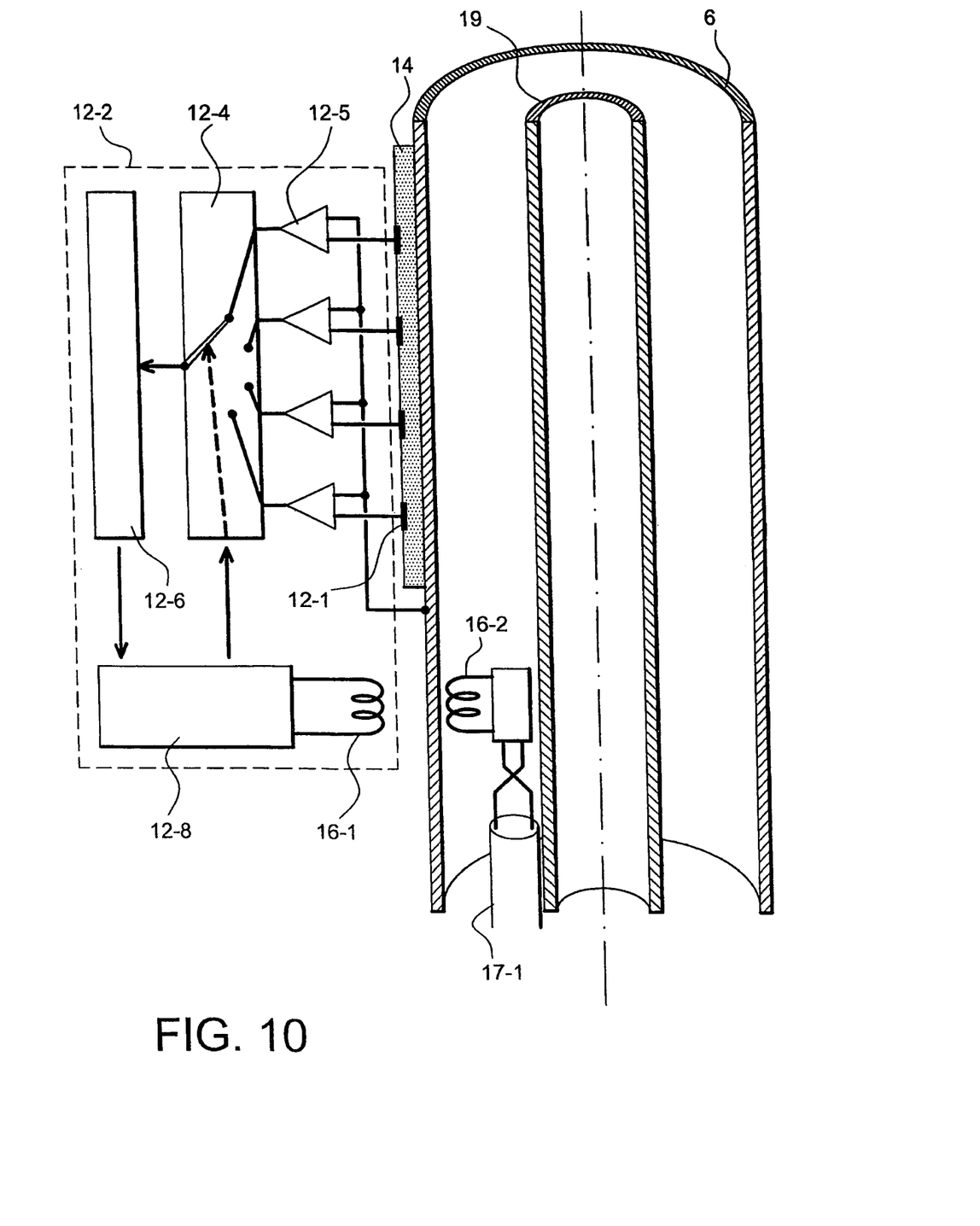

FIG. 10 repeats this inductive coupling principle, but in this case coupling is made through the wall of the casing 6. It is often preferable not to have any conductors outside the casing embedded in the cement since it is often difficult to lower and position the cables. This configuration eliminates the cable along the outside of the casing and replaces it by a cable 17-1 along the inside of the casing 6, inside the space that it delimits with the production tubing 19. The coupling can also be optimized by choosing a high frequency appropriate for the power supply, and another frequency for transmission and control without any risk of interference either with the processing means 12-2 or with the means 10 of circulating the current in the reservoir.

Means of circulating the current in the reservoir are not shown in FIGS. 8 to 10, but they may be similar to those shown in FIGS. 6 and 7.

Current emission and potential measurements of electrodes in the well are synchronized through specific signals on the cable and through the inductive coupler.

One of the advantages of the apparatus according to the invention is that it is compatible with conventional casing elements. The apparatus according to the invention can be installed along with conventional casing completions for producing regions of the well. These are typically perforated using explosive charges in the conventional manner.

The invention claimed is:

1. An apparatus for monitoring an underground formation trough which a borehole passes from surface comprising:
   a conductive casing located in the borehole passing through the formation;
   a plurality of sensors for measuring an electrical property of the formation wherein the plurality of sensors is located in the borehole outside the casing, is connected to the surface and is electrically insulated from the casing;
   an electrical current source connected to the casing and to a reference electrode offset from the well and the casing; wherein said electrical current source is arranged to inject a current into the formation;
   whereby the casing has an electrically insulating coating over the outer surface thereof, at least in the region of the sensors, and an electrically conductive portion in electrical contact with the formation such that the current flows into the formation from the electrically conductive portion, and whereby the sensors measure the electrical property of the formation resulting from such current flow.

2. The apparatus of claim 1, wherein the casing comprises an elongate portion having the insulated coating thereon, and a plurality of conductive portions spaced along the elongate portion.

3. The apparatus of claim 2, wherein the plurality of conductive portions are formed by interruptions in the insulating coating which expose the electrically conductive casing to the formation.

4. The apparatus of claim 1, wherein the casing comprises a series of tubular elements joined end to end by means of threaded couplings.

5. The apparatus of claim 4, wherein the ends of the tubular elements forming the threaded couplings comprise the conductive portions of the casing.

6. The apparatus of claim 1, wherein the borehole and casing extend below the formation, an insulating joint being provided in the casing at the bottom of the formation to prevent current flow into the casing below the formation.

7. The apparatus of claim 1, wherein the reference electrode is positioned in the ground at the surface.

8. The apparatus of claim 1, wherein the sensors are fixed to the outer wall of the casing.

9. The apparatus of claim 1, wherein the sensors are connected to the surface via a link wire that runs along a wall of the casing.

10. The apparatus of claim 1, wherein the sensors are connected to the surface via an inductive coupling.

11. The apparatus of claim 10, wherein the inductive coupling passes through the wall of the casing.

12. The apparatus of claim 1, further comprising acquisition and processing means which receive measurement signals from the sensors.

13. The apparatus of claim 12, wherein the acquisition and processing means are located on the surface.

14. The apparatus of claim 12, wherein the acquisition and processing means are located, at least partly, in the borehole below the surface.

15. The apparatus of claim 14, wherein at least part of the acquisition and processing means is located in a housing fixed to the casing below the surface.

16. The apparatus of claim 12, wherein the acquisition and processing means comprise a device for shaping the measurement and referenced with respect to a reference voltage.

17. The apparatus of claim 16 wherein the reference voltage is the voltage of a reference electrode.

18. The apparatus of claim 16 wherein the reference voltage is the casing voltage close to the electrically conductive portion.

19. The apparatus of claim 12 wherein the acquisition and processing means comprise a multiplexer to select a particular sensor from which it receives measurement signals.

20. The apparatus of claim 12 wherein the acquisition and processing means comprise an analogue digital conversion device to digitize the measurement signals.

21. The apparatus of claim 12 wherein the acquisition and processing means comprise a memory device to store the measurement signals.

22. The apparatus of claim 12 wherein the acquisition and processing means cooperate with an operating and control device located in the borehole.

* * * * *